United States Patent [19]
Norris et al.

[11] Patent Number: 6,007,618
[45] Date of Patent: Dec. 28, 1999

[54] KAOLIN CLAYS WHICH ARE CONDITIONED PRIOR TO REMOVING IMPURITIES

[75] Inventors: Joseph Allen Norris, Wrightsville, Ga.; Jorge L. Yordan, Parker, Colo.

[73] Assignee: Thiele Kaolin Company, Sandersville, Ga.

[21] Appl. No.: 08/967,070

[22] Filed: Nov. 10, 1997

Related U.S. Application Data

[63] Continuation-in-part of application No. 08/509,506, Jul. 28, 1995, Pat. No. 5,685,899.

[51] Int. Cl.$^6$ .......................... C04B 14/10; C04B 33/04; C04B 33/10
[52] U.S. Cl. .......................... 106/487; 501/147; 501/148; 252/61; 209/164; 209/166
[58] Field of Search .............................. 106/487; 252/61; 501/147, 148, 146; 209/3, 4, 9, 162, 164, 166

[56] References Cited

U.S. PATENT DOCUMENTS

| | | | |
|---|---|---|---|
| 3,410,399 | 11/1968 | Hunter | 209/5 |
| 3,450,257 | 6/1969 | Cundy | 209/5 |
| 4,483,624 | 11/1984 | Bacon et al. | 366/293 |
| 4,492,628 | 1/1985 | Young et al. | |
| 4,629,556 | 12/1986 | Yoon et al. | 209/166 |
| 4,871,466 | 10/1989 | Wang et al. | |
| 4,929,343 | 5/1990 | Wang et al. | |
| 5,223,463 | 6/1993 | Bilimoria et al. | |
| 5,358,120 | 10/1994 | Gantt et al. | 209/4 |

*Primary Examiner*—Michael Marcheschi
*Attorney, Agent, or Firm*—Kennedy, Davis & Hodge

[57] ABSTRACT

Kaolin clays are conditioned for the removal of colored titaniferous impurities by (A) first mixing the kaolin clay with a collector to condition the impurities, in the absence of a dispersant, but in the presence of sufficient water to yield a mixture having a solids content of at least 65 percent by weight and (B) then deflocculating the kaolin clay mixture at a pH of at least 4.0 with a dispersant in amounts sufficient to yield a kaolin clay slurry which is suitable for subsequent processing to remove colored titaniferous impurities.

15 Claims, No Drawings

KAOLIN CLAYS WHICH ARE CONDITIONED PRIOR TO REMOVING IMPURITIES

This application is a continuation-in-part of U.S. patent application Ser. No. 08/509,506, filed Jul. 28, 1995, now U.S. Pat. No. 5,685,899.

TECHNICAL FIELD

This invention relates to a process for conditioning kaolin clays. In a more specific aspect, this invention relates to a process for conditioning kaolin clays prior to removing impurities from such clays. This invention also relates to kaolin clays produced by the process of this invention.

BACKGROUND OF THE INVENTION

Kaolin is a naturally occurring, relatively fine, white clay which may be generally described as a hydrated aluminum silicate. After purification and beneficiation, kaolin clay is widely used as a filler and pigment in various materials, such as rubber and resins, and in various coatings, such as paints and coatings for paper.

Crude kaolin clay, as mined, contains various forms of discoloring impurities, two major impurities being anatase ($TiO_2$) and iron oxides. To make the clay more acceptable for use in the paper industry, these impurities must be substantially removed by appropriate techniques.

The production of high brightness clays usually includes at least two processing steps. In a first step, a significant portion of the impurities, mainly anatase, is removed by employing one or more physical separation techniques, such as centrifugation, sedimentation, high gradient magnetic separation, froth flotation and/or selective flocculation. The remaining impurities, mainly iron oxides, are subsequently removed by known techniques, such as chemical leaching.

Froth flotation is regarded as one of the most efficient methods for removing colored impurities from kaolin clay. Typically, clays to be beneficiated by froth flotation are first blunged in the presence of a dispersant and pH modifier and then conditioned with a collector. The job of the collector is to selectively adsorb to impurities and render them hydrophobic. This part of the process is referred to as conditioning. The conditioned impurities, mainly titanium dioxide in the form of iron-rich anatase, are then removed in a flotation machine via the attachment of the hydrophobic impurities to air bubbles which are injected into the feed slurry or into the flotation pulp.

Two general categories of compounds are reported in the literature as collectors for titaniferous impurities in kaolin clay. Cundy U.S. Pat. No. 3,450,257 discloses the use of fatty acid compounds as collectors, and Yoon & Hilderbrand U.S. Pat. No. 4,629,556 discloses the use of hydroxamate compounds as collectors. Each category of compounds has advantages and disadvantages.

However, conventional flotation processing is adversely affected by the dispersant and pH modifier which tend to disrupt the mechanism by which the collector attaches to the impurities. This and other problems encountered when dispersing (i.e., deflocculating a crude kaolin clay for flotation beneficiation) are discussed in Hunter U.S. Pat. No. 3,410,399.

Therefore, a need exists in the kaolin clay industry for a process which will effectively condition kaolin clays for subsequent removal of impurities, such as in a flotation process.

SUMMARY OF THE INVENTION

Briefly described, the present invention provides an improved process for conditioning kaolin clays prior to removing impurities from such clays in a subsequent processing step. More specifically, this invention provides an improved process for such conditioning of kaolin clays in which the kaolin clays are first conditioned and then slurried in the presence of a dispersant and optionally a pH modifier.

The present invention provides a process by which, depending upon the starting kaolin clay materials, the removal of colored titaniferous impurities from such clays is either equivalent to or improved over conventional processing to remove such impurities.

Additionally, the present invention provides a process which utilizes the advantages of the collector to remove impurities but which avoids the disadvantages associated with deflocculating kaolin clays prior to conditioning.

The present invention also provides kaolin clays which are effectively conditioned for subsequent removal of impurities.

In addition, the present invention provides a process which can be effectively used to condition many types of kaolin clay, including those clays which require a high concentration of dispersant to achieve deflocculation. Examples of clays which can be conditioned by the process of this invention include the coarse-grained clays of Middle Georgia, the fine-grained clays of East Georgia and similar clays which can be found in Brazil and Australia.

Further, the present invention provides a process in which a wide range of dispersants can be used to deflocculate the kaolin clay, because such dispersants are added after the clay has been conditioned.

Accordingly, an object of this invention is to provide an improved process for conditioning kaolin clays.

Another object of this invention is to provide a process for conditioning kaolin clays prior to removing impurities from such clays in a process such as flotation, sedimentation, centrifugation, high gradient magnetic separation and/or selective flocculation.

Another object of this invention is to provide a process for conditioning kaolin clays by which the subsequent removal of impurities from such clays is more efficient.

Another object of this invention is to provide a process for conditioning kaolin clays by which the subsequent removal of impurities from such clays results in an increased clay recovery.

Still another object of this invention is to provide a process for conditioning kaolin clays in which the clays are first conditioned and then deflocculated with a dispersant and optionally a pH modifier.

Still another object of this invention is to provide a process for conditioning kaolin clays in which the slurry products have improved low shear and high shear viscosities compared to the starting kaolin clay material.

Still another object of this invention is to provide kaolin clays which are conditioned prior to the removal of impurities.

Yet still another object of the present invention is to provide kaolin clays which have been conditioned prior to deflocculation.

Yet still another object of this invention is to provide a process which can be effectively used to condition various types of kaolin clays, including fine-and coarse-grained clays.

DETAILED DESCRIPTION OF THE INVENTION

Yet still another object of this invention is to provide a process in which a wide range of dispersants can be used due to conditioning the kaolin clay prior to the addition of a dispersant.

These and other objects, features and advantages of this invention will become apparent from the following detailed description.

In accordance with the present invention, kaolin clays are treated (i.e., conditioned) with a collector and then deflocculated to enable impurities to be removed in a subsequent processing step. A pH modifier is preferably added with the dispersant, but such addition is optional.

We have discovered that, by conditioning prior to deflocculation, the subsequent removal of colored titaniferous impurities from kaolin clays is more effective. A more effective removal of impurities results in an increased recovery of kaolin clay.

As a first step in carrying out the process of this invention, kaolin clay is mixed, in the absence of a dispersant, with a collector to condition the impurities. The mixing is continued until a substantially homogenous kaolin clay mixture is obtained. In this first step, water (which may be added and/or derived from the kaolin clay) is present in an amount sufficient to yield a kaolin clay mixture having a solids content of at least 65 percent by weight.

As a second or subsequent step in carrying out the process of this invention, the mixture from the first step is deflocculated with a dispersant, preferably with a pH modifier, to yield a kaolin clay slurry product which is suitable for subsequent processing to remove colored titaniferous impurities. A preferred method to remove such impurities is flotation processing as described above.

The mixing in the first step can be accomplished with equipment well known in this industry, including extruders, kneaders and pug mills. Examples of such equipment are described in Perry's Chemical Engineers' Handbook, 6th Edition (1985), McGraw Hill Book Company, Section 19, pp.14–24. The mixing equipment must be selected in order to mechanically work the kaolin clay and exert sufficient energy to produce a high shear/smearing action between the collector and the colored titaniferous impurities in the clay particles. The mixing equipment must be selected to operate in the absence of a dispersant, so that intimate contact can be obtained between the collector and the clay particle surfaces which have not been contaminated with a dispersant.

In the first step, the kaolin clay is mixed under conditions which insure that the kaolin clay is subjected to an energy level of at least 10 horsepower-hours per ton of dry kaolin clay. However, the kaolin clay must not be subjected to an energy level which will destroy the collector. This maximum energy level must be determined for each type of kaolin clay and/or collector.

As described above, a collector is used in the first step of this invention. For purposes of this invention, the term "collector" will be understood to refer to any chemical which will condition the colored titaniferous impurities to render them susceptible to being removed in a subsequent processing step, such as by attachment to air bubbles in a flotation process.

The collector employed in the first step can be, for example, any collector which is conventionally used in a flotation process. Examples of such collectors are fatty acids (including mixtures thereof) having the general formula:

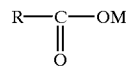

in which R is an alkyl, aryl or alkylaryl group having 1–26 carbon atoms, and M is hydrogen, an alkali metal or an alkaline earth metal.

Examples of suitable R groups include methyl, ethyl, butyl, octyl, lauryl, 2-ethylhexyl, oleyl, eicosyl, phenyl, tolyl, naphthyl and hexylphenyl.

Examples of suitable alkali metals are lithium, sodium and potassium.

Examples of suitable alkaline earth metals are magnesium, calcium and barium.

These fatty acid compounds are commercially available, such as from Westvaco Corporation, Chemical Division, Charleston Heights, S.C.

An especially preferred fatty acid compound is commercially available from Westvaco Corporation under the trademark WESTVACO L-5. This compound is a tall oil, which is a mixture of fatty acid compounds.

Other suitable collectors are hydroxamate compounds (including mixtures thereof) having the general formula:

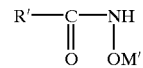

in which R' is an alkyl, aryl or alkylaryl group having 4–28 carbon atoms, and M' is hydrogen, an alkali metal or an alkaline earth metal.

Examples of suitable R' groups include butyl, hexyl, octyl, dodecyl, lauryl, 2-ethylhexyl, oleyl, eicosyl, phenyl, tolyl, naphthyl and hexylphenyl.

Examples of suitable alkali metals are lithium, sodium and potassium.

Examples of suitable alkaline earth metals are magnesium, calcium and barium.

These hydroxamate compounds are available commercially, such as from Cytec Industries, Inc., West Paterson, N.J.

An especially preferred hydroxamate compound is commercially available from Cytec Industries, Inc. under the trademark S-6493 MINING REAGENT. This compound is a mixture of alkyl hydroxamic acids.

The hydroxamate collectors used in the invention can be prepared by conventional methods, such as shown in Yoon & Hilderbrand U.S. Pat. No. 4,629,556; Wang & Nagaraj U.S. Pat. No. 4,871,466; and Wang & Nagaraj U.S. Pat. No. 4,929,343.

Examples of hydroxamates which are useful in the process of the invention include potassium butyl hydroxamate, potassium octyl hydroxamate, potassium lauryl hydroxamate, potassium 2-ethylhexyl hydroxamate, potassium oleyl hydroxamate, potassium eicosyl hydroxamate, potassium phenyl hydroxamate, potassium naphthyl hydroxamate, potassium hexylphenyl hydroxamate, and the corresponding salts of sodium and other alkali or alkaline earth metals. The salts can be converted to the corresponding acids by conventional methods known to those skilled in the art.

The collector is preferably mixed with the kaolin clay and water under conditions which permit reaction between the collector and the impurities in the clay in a relatively short time.

The amount of collector mixed with the kaolin clay depends on various factors, such as the amount of impurities present in the clay, the nature of the clay to be processed and the amount of dry clay starting material.

In the second step of this process, a suitable dispersant, such as sodium silicate, a polyacrylate, sodium hexametaphosphate and mixtures thereof, is added to deflocculate the kaolin clay mixture from the first step. Generally, the dispersant will be added in an amount, e.g., 1–20 pounds per ton of dry solids, to produce a well-dispersed product suitable for subsequent processing to remove colored titaniferous impurities.

A pH modifier, such as soda ash, sodium hydroxide, ammonium hydroxide, potassium hydroxide, lithium hydroxide and mixtures thereof is added if needed during the second step to maintain a pH of at least 4.0.

A frothing agent, such as that commercially available from Cytec Industries under the trademark AEROFROTH 65, may be added if needed during the second step to assist in the subsequent processing to remove colored titaniferous impurities.

The present invention is further illustrated by the following examples which are illustrative of certain embodiments designed to teach those of ordinary skill in the art how to practice this invention and to represent the best mode contemplated for practicing this invention.

In the following examples, the efficiency of the various collectors in removing titaniferous impurities from kaolin clays by froth flotation will be compared using an index known as the "coefficient of separation" (C.S.), which was first used as a measure of process performance in kaolin flotation by Wang and Somasundaran; see *Fine Particles Processing* Vol. 2, Chapter 57, pages 1112–1128 (1980). The C.S. index takes into account not only the amount of impurities removed by the process but also the amount of clay product lost as a result of the process. The mathematical expression used to compute the Coefficient of Separation is the following:

$$C.S. = \frac{\% \text{ Yield of Clay} + \% \text{ TiO}_2 \text{ removed by flotation} - 100}{100}$$

in which the % yield of clay represents the weight of kaolin clay recovered in the clay product expressed in terms of percentage of the calculated total weight of kaolinite in the feed and the % $TiO_2$ removed by flotation represents the weight of total $TiO_2$ rejected into the floated tailing expressed in terms of the percentages of the total weight of $TiO_2$ in the feed.

The value of the C.S. index varies theoretically from zero for no separation to 1 for a perfect separation as in the unrealistic case in which all (100 percent) of the impurities are removed from the kaolin with absolutely no loss (100 percent yield) of clay. In the case of kaolin beneficiation by froth flotation, the C.S. index typically ranges from 0.30–0.75.

In this patent application, the C.S. index is used to compare the efficiency of the conventional method (deflocculation followed by conditioning) versus that of the present invention (conditioning followed by deflocculation). For purposes of comparison, the performance is considered different only when the C.S. indices differ by more than 0.1 units.

An ultimate object of removing titaniferous impurities from kaolin clays is to improve the GE brightness and color of the processed clays. Those skilled in the art of kaolin beneficiation by froth flotation know that, to achieve GE brightness levels of or in excess of 90.0, the content of titaniferous impurities (as % $TiO_2$) in the final product is not expected to exceed 0.5% for coarse-grained clays or 1.0% for fine-grained clays. One skilled in the art also knows that any attempt to try to reduce the content of impurities in the clay much further may result in an unacceptably large loss in clay yield and only a very marginal gain in brightness.

In this patent application, the term "grade" either refers to the content of the marketable or valuable end product in the material to be concentrated or refers to the impurity to be removed. In metallic ores, the percent metal (e.g., %Cu, %Fe, %Au, etc.) is often used as a measure of grade, while in some metals sold in oxide form, the grade is quoted in terms of the marketable oxide content (e.g., %$TiO_2$, %$Fe_2O_3$, etc.). The mineral content (e.g., %$CaCO_3$, %$CaF_2$, etc.) is used to quantify the grade of non-metallic ores. On the other hand, the amount of impurities present (e.g., %$TiO_2$, %$Fe_2O_3$, etc.) is used as a measure of grade in kaolin.

EXAMPLES 1–2

Two samples (Examples 1–2) of coarse-grained kaolin clay from Washington County, Ga. containing approximately 1.5 percent $TiO_2$ and 20.0 percent free moisture are tested for flotation response as follows.

In Example 1 which represents the conventional method, 2000 grams of dry clay equivalent are blunged at 60 percent solids for 6 minutes in a high speed mixer at 6,200 rpm with 3 pounds per ton sodium silicate (active basis) and 3 pounds per ton soda ash. An alkyl hydroxamate collector (S-6493 MINING REAGENT) is introduced at the rate of 2 pounds per ton (as received basis), and the slurry is conditioned an additional 6 minutes at 6,200 rpm. The conditioned clay slurry is diluted to 25 percent solids and tested in a DENVER D-12 flotation machine operating at 1,800 rpm. Demineralized water is used for blunging/conditioning and flotation to negate the possible effects of heavy metal ions present in tap water. A portion of the beneficiated clay slurry is removed to calculate pulp density from which percent yield is calculated. A second portion of the beneficiated clay slurry is removed for x-ray analysis to determine residual $TiO_2$ content. The percent yield and residual $TiO_2$ are used to calculate the coefficient of separation as described by Wang and Somasundaran (1980).

In Example 2 which represents the present invention, the order of the blunging and conditioning steps is reversed to allow the introduction of the alkyl hydroxamate prior to deflocculation. This method is as follows: 900 grams of dry clay equivalent, 2 pounds per ton alkyl hydroxamate collector (as used in Example 1), and demineralized water are added to a READCO one quart laboratory mixer and allowed to mix at 74–75 percent solids for 15 minutes. This process is carried out on three 900 gram samples. The mixer is fitted with two sigma type blades rotating at 75 rpm and a lid which prevents the loss of clay and reagents and which assures a high level of contact between the blades and the contents. 2000 grams of this conditioned clay are then deflocculated by blunging at 6,200 rpm at 60 percent solids with 3 pounds per ton sodium silicate and 3 pounds per ton soda ash. The blunged slip is then diluted and tested in the DENVER machine. A portion of the beneficiated clay slurry is removed to calculate pulp density from which percent yield is calculated. A second portion of the beneficiated clay slurry is removed for x-ray analysis to determine residual $TiO_2$ content. The percent yield and residual $TiO_2$ are used to calculate the coefficient of separation as described by Wang and Somasundaran (1980).

The results given in Table 1 indicate that this invention (Example 2) effectively prepares coarse-grained kaolin clay for flotation response. In Example 2, grade, percent yield and the efficiency of $TiO_2$ removal are equivalent to the conventional method (Example 1).

TABLE 1

|  | #/ton | pH | % $TiO_2$ removed by flotation (a) | % Yield of clay (b) | Coefficient of separation |
|---|---|---|---|---|---|
| Example 1 |  |  |  |  |  |
| Alkyl Hydroxamate | 2 |  |  |  |  |
| Sodium Silicate | 3 | 8.1 | 80.0 | 90.0 | 0.70 |
| Soda Ash | 3 |  |  |  |  |
| Example 2 |  |  |  |  |  |
| Alkyl Hydroxamate | 2 |  |  |  |  |
| Sodium Silicate | 3 | 7.9 | 76.0 | 91.3 | 0.67 |
| Soda Ash | 3 |  |  |  |  |

(a) % $TiO_2$ removed by flotation: Weight of total $TiO_2$ rejected into the floated tailing expressed in terms of the percentage of the total weight of $TiO_2$ in the feed.
(b) % Yield of clay: Weight of kaolin clay recovered in the clay product expressed in terms of percentage of the calculated total weight of kaolinite in the feed.

EXAMPLES 3–4

Two samples (Examples 3–4) of crude fine-grained kaolin clay from East Georgia are used in an amount equivalent to 2000 grams of dry clay in each of two tests.

In Example 3 which represents the conventional method, the clay is first blunged for 6 minutes at 6,200 rpm at 60 percent solids in the presence of 9 pounds per ton sodium silicate and 2 pounds per ton soda ash. Four pounds per ton alkyl hydroxamate collector (S-6493 MINING REAGENT) are added, and the slurry is conditioned an additional 6 minutes at 6,200 rpm. This conditioned slurry is then diluted with demineralized water to 25 percent solids and tested on the DENVER D-12 flotation machine at 1,800 rpm. A portion of the beneficiated clay slurry is removed to calculate pulp density from which percent yield is calculated. A second portion is removed for x-ray analysis to determine residual $TiO_2$ content. The percent yield and residual $TiO_2$ are used to calculate the coefficient of separation as described by Wang and Somasundaran (1980).

In Example 4 which represents the present invention, the clay is mixed at 900 grams dry clay equivalent at 74–75 percent solids in the READCO lab mixer at 75 rpm for 15 minutes in the presence of 4 pounds per ton of the alkyl hydroxamate collector used in Example 3. This process is carried out on three 900 gram samples. From these three samples, a 2000 gram dry clay equivalent sample is taken and blunged for 6 minutes at 6,200 rpm at 60 percent solids in the presence of 4 pounds per ton of sodium hexametaphosphate (SHMP) and 3 pounds per ton soda ash. Clay conditioned and dispersed in this manner is then diluted with demineralized water to 25 percent solids and tested on the DENVER D-12 flotation machine at 1,800 rpm. A portion of the beneficiated clay slurry is removed to calculate pulp density from which percent yield is calculated. A second portion is removed for x-ray analysis to determine residual $TiO_2$ content. The percent yield and residual $TiO_2$ are used to calculate the coefficient of separation as described by Wang and Somasundaran (1980).

TABLE 2

|  | #/ton | pH | % $TiO_2$ removed by flotation | % Yield of clay | Coefficient of separation |
|---|---|---|---|---|---|
| Example 3 |  |  |  |  |  |
| Alkyl Hydroxamate | 4 |  |  |  |  |
| Sodium Silicate | 9 | 8.6 | 60.7 | 67.3 | 0.28 |
| Soda Ash | 2 |  |  |  |  |
| Example 4 |  |  |  |  |  |
| Alkyl Hydroxamate | 4 |  |  |  |  |
| SHMP | 4 | 8.0 | 80.0 | 82.2 | 0.62 |
| Soda Ash | 3 |  |  |  |  |

The results given in Table 2 demonstrate the improved effectiveness of this invention when conditioning fine-grained East Georgia clay. This invention provides increased $TiO_2$ removal while increasing the yield of clay.

EXAMPLES 5–6

Two samples (Examples 5–6) of crude coarse-grained kaolin clay from Middle Georgia are used in an amount equivalent to 2000 grams of dry clay in each of two tests.

In Example 5 which represents the conventional method, the clay is first blunged for 6 minutes at 6,200 rpm at 60 percent solids in the presence of 4 pounds per ton sodium hexametaphosphate and 3 pounds per ton soda ash. Two pounds per ton of alkyl hydroxamate collector (S-6493 MINING REAGENT) is added, and the slurry is conditioned an additional 6 minutes at 6,200 rpm. This conditioned slurry is then diluted with demineralized water to 25 percent solids and tested on the DENVER D-12 flotation machine at 1,800 rpm. A portion of the beneficiated clay slurry is removed to calculate pulp density from which percent yield is calculated. A second portion is removed for x-ray analysis to determine residual $TiO_2$ content. The percent yield and residual $TiO_2$ are used to calculate the coefficient of separation as described by Wang and Somasundaran (1980).

In Example 6 which represents the present invention, the clay is mixed at 900 grams dry clay equivalent at 74–75 percent solids in the READCO lab mixer at 75 rpm for 15 minutes in the presence of 3.5 pounds per ton of the collector used in Example 5. This process is carried out on three 900 gram samples. From these three samples, a 2000 gram dry clay equivalent sample is taken and blunged for 6 minutes at 6,200 rpm at 60 percent solids in the presence of 4 pounds per ton sodium hexametaphosphate and 3 pounds per ton soda ash. Clay conditioned and dispersed in this manner is then diluted with demineralized water to 25 percent solids and tested on the DENVER D-12 flotation machine at 1,800 rpm. A portion of the beneficiated clay slurry is removed to calculate pulp density from which percent yield is calculated. A second portion is removed for x-ray analysis to determine residual $TiO_2$ content.

The results shown in Table 3 indicate that the process of this invention is not affected by the dispersant type. Kaolin clay conditioned in accordance with this invention and then deflocculated with sodium hexametaphosphate, a dispersant known to be problematic in this type of conditioning process—see Hunter U.S. Pat. No. 3,410,399, produces a slurry with excellent grade and recovery. However, a sample prepared in the conventional manner with the same dispersant exhibits no $TiO_2$ removal.

TABLE 3

|  | #/ton | pH | % $TiO_2$ removed by flotation | % Yield of clay | Coefficient of separation |
|---|---|---|---|---|---|
| Example 5 | | | | | |
| Alkyl Hydroxamate | 2 | | | | |
| SHMP | 4 | 8.2 | 0.0 | N/A | 0.00 |
| Soda Ash | 4 | | | | |
| Example 6 | | | | | |
| Alkyl Hydroxamate | 3.5 | | | | |
| SHMP | 4 | 8.0 | 82.0 | 90 | 0.72 |
| Soda Ash | 4 | | | | |

EXAMPLES 7–8

In Example 7, 2000 dry grams of a fine-grained kaolin clay from East Georgia are processed in the conventional manner by first blunging for 6 minutes at 6,200 rpm at 60 percent solids in the presence of 3 pounds per ton sodium silicate and 3 pounds per ton soda ash. Two pounds per ton alkyl hydroxamate collector (S-6493 MINING REAGENT) is added, and the slurry is conditioned an additional 6 minutes at 6,200 rpm. This conditioned slurry is then diluted with demineralized water to 25 percent solids and floated on the DENVER D-12 flotation machine at 1,800 rpm. A portion is removed for x-ray analysis to determine residual $TiO_2$ content. Clay beneficiated in this manner is then ozoned for thirty minutes, fractionated to 90 percent <2 um equivalent spherical diameter and flocculated by addition of sulfuric acid to pH 3.0. Clay is leached with sodium hydrosulfite at the rate of 9 pounds per ton. Leached clay is filtered, diluted to 20 percent solids, refiltered and then optimally redispersed with the addition of 1 pound per ton soda ash and 3 pounds per ton sodium polyacrylate. The clay is dried and tested for brightness, color and viscosity.

In Example 8, clay from East Georgia is processed according to the present invention by mixing 900 grams dry clay equivalent at 70 percent solids in the READCO lab mixer at 75 rpm for 15 minutes in the presence of 4 pounds per ton alkyl hydroxamate. This process is carried out on three 900 gram samples. From these three samples, a 2000 gram dry clay equivalent sample is taken and blunged for 6 minutes at 6,200 rpm at 60 percent solids in the presence of 4 pounds per ton sodium hexametaphosphate and 4 pounds per ton soda ash. The conditioned and dispersed clay is then diluted with demineralized water to 25 percent solids and tested on the DENVER D-12 flotation machine at 1,800 rpm. Clay beneficiated in this manner is then ozoned for 30 minutes, fractionated to 90 percent <2 um equivalent spherical diameter and flocculated by addition of sulfuric acid to pH 3.0. The clay is leached with sodium hydrosulfite at the rate of 9 pounds per ton. The leached clay is filtered, diluted to 20 percent solids, refiltered and then redispersed with the addition of 2.7 pounds per ton soda ash. The clay is dried and tested for brightness, color and viscosity.

As shown in Table 4, these properties are equal or improved in Example 8, except for Brookfield viscosity. In Example 8, the Brookfield viscosity is higher than in Example 7 because the dispersant system is optimized in Example 7 but not in Example 8.

TABLE 4

|  | GE brightness | L | a | b | Brookfield viscosity (cP) | Hercules viscosity dynes @ 1100 rpm |
|---|---|---|---|---|---|---|
| Example 7 | 90.7 | 96.6 | 0.24 | 2.34 | 250 | 5 |
| Example 8 | 91.2 | 96.4 | 0.16 | 1.66 | 450 | 5 |

EXAMPLES 7A–8A

Two samples of fine-grained kaolin clay from East Georgia are processed using the conventional method and the present invention.

In Example 7A which represents the conventional method, 2000 dry grams of clay are blunged for 6 minutes at 6000 rpm using a high speed mixer. The clay is blunged at 55% solids using 5.6 pounds per ton of pounds per ton of sodium silicate and 4.25 pounds per ton soda ash. Four pounds per ton of alkyl hydroxamate collector (CYTEC S-6493 MINING REAGENT) are added to the deflocculated slurry and then mixed for another 6 minutes at 6000 rpm. This mixture is diluted to 25% solids with deionized water and floated using a DENVER D-12 flotation machine with 0.2 pounds per ton of AEROFROTH 65 (from Cytec Industries) added as the frothing agent. After flotation, a portion is taken for x-ray fluorescence analysis to determine $TiO_2$ content while the remainder is ozoned to remove any residual flotation chemicals. The flotation product is then classified by settling at about 20 minutes per inch of slurry and flocculated by the addition of 12 pounds per ton of alum and adjusting the pH to 3 by adding sulfuric acid. This slurry is then leached with 9 pounds per ton of sodium hydrosulfite, filtered, washed, refiltered and then dried. The clay sample is then optimally dispersed at 70% solids using sodium polyacrylate with soda ash added to adjust the pH to 6.5–7.0. The clay is then tested for Brookfield and Hercules viscosities.

In Example 8A, the East Georgia clay is processed using the present invention. Two 1100 dry gram samples are mixed in a READCO laboratory mixer at 70% solids for 20 minutes in the presence of 4 pounds per ton of CYTEC S-6493 MINING REAGENT (alkyl hydroxamate). From these two samples, a 2000 dry gram clay sample is taken and blunged for 6 minutes at 6000 rpm in a high speed mixer. The sample is blunged at 50% solids using 3.7 pounds per ton of sodium silicate and 5 pounds per ton of soda ash. The dispersed clay is then diluted to 25% solids and floated in a DENVER D-12 flotation machine using 0.2 pound per ton of Aerofroth 65 frothing agent. The clay yield and the $TiO_2$ content of the flotation product are determined after flotation. The flotation product is then processed and characterized as described for Example 7A.

The results presented in Table 4A show that the $TiO_2$ rejection, yield and coefficient of separation obtained by flotation using the present invention are higher than those obtained using the conventional method. Another advantage with the use of the present invention is the improvement in Brookfield and Hercules viscosities.

TABLE 4A

|  | %TiO$_2$ removed by flotation | % Yield of clay | Coefficient of separation | Brookfield viscosity (cP @ 20 rpm) | Hercules viscosity (dynes @ 1100 rpm) |
|---|---|---|---|---|---|
| Example 7A | 56.9 | 76 | 0.33 | 260 | 1.3 |
| Example 8A | 62.0 | 85 | 0.48 | 234 | 1.0 |

EXAMPLES 9–10

Two samples (Examples 9–10) of coarse-grained clay from Washington County, Ga. containing approximately 1.5 percent TiO$_2$ and 20.0 percent free moisture and known to be especially high in Brookfield viscosity are tested for flotation response as follows.

In Example 9 which represents the conventional method, 2000 grams of dry clay equivalent are blunged at 60 percent solids for 10 minutes in a high speed mixer at 4,500 rpm with 6 pounds per ton sodium silicate (active basis) and 3 pounds per ton soda ash. An alkyl hydroxamate collector (S-6493 MINING REAGENT) is introduced at the rate of 4 pounds per ton (as received basis), and the slurry is conditioned an additional 10 minutes at 4,500 rpm. The conditioned clay is diluted to 25 percent solids, a frothing agent (AEROFROTH 65 from Cytec Industries) is added at the rate of 0.2 pounds per ton (as received basis) and the slurry is tested on a DENVER D-12 flotation machine operating at 1,500 rpm. Demineralized water is used for blunging/ conditioning and flotation to negate the possible effects of heavy metal ions present in tap water. A portion of the beneficiated clay slurry is removed to calculate pulp density from which percent yield is calculated. A second portion of the beneficiated clay slurry is removed for x-ray analysis to determine residual TiO$_2$ content. The percent yield and residual TiO$_2$ are used to calculate the coefficient of separation as described by Wang and Somasundaran (1980). The floated product is then ozonated for one hour, screened through a 270 mesh screen, and flocculated and leached with 2 pounds per ton alum and 5 pounds per ton sodium hydrosulfite. The leached clay is then filtered and deflocculated in a low shear mixer using a 60 percent/40 percent soda ash/sodium polyacrylate blend to increase the pH to approximately 7.0. The clay is then spray dried, reslurried to 70 percent solids using a HAMILTON BEACH mixer at low speed, and tested for Brookfield and Hercules viscosities.

In Example 10 which represents the present invention, 900 grams dry clay equivalent is mixed at 74–75 percent solids in a READCO lab mixer at 75 rpm for 15 minutes in the presence of 4 pounds per ton of the hydroxamate collector (S-6493 MINING REAGENT). This process is carried out on three 900 gram samples. From these three samples, a 2000 gram dry clay equivalent sample is taken and blunged for 6 minutes at 5000 rpm at 60 percent solids in the presence of 6 pounds per ton sodium silicate (active basis) and 3 pounds per ton soda ash. Clay conditioned and dispersed in this manner is then diluted with demineralized water to 25 percent solids, a frothing agent (AEROFROTH 65) is added at the rate of 0.2 pounds per ton (as received basis) and the slurry is tested on a DENVER D-12 flotation machine operating at 1,500 rpm. Demineralized water is used for blunging/conditioning and flotation to negate the possible effects of heavy metal ions present in tap water. A portion of the beneficiated clay slurry is removed to calculate pulp density from which percent yield is calculated. A second portion of the beneficiated clay slurry is removed for x-ray analysis to determine residual TiO$_2$ content. The percent yield and residual TiO$_2$ are used to calculate the coefficient of separation as described by Wang and Somasundaran (1980). The floated product is then ozonated for one hour, screened through a 270 mesh screen, and flocculated and leached with 2 pounds per ton alum and 5 pounds per ton sodium hydrosulfite. The leached clay is then filtered and deflocculated in a low shear mixer using a 60 percent/40 percent soda ash/sodium polyacrylate blend to increase the pH to approximately 7.0. The clay is then spray dried, reslurried to 70 percent solids using a HAMILTON BEACH mixer at low speed, and tested for Brookfield and Hercules viscosities.

TABLE 5

|  | % TiO$_2$ removed by flotation | % Yield of clay | Coefficient of separation | Brookfield viscosity (cP) | Hercules viscosity | Percent solids |
|---|---|---|---|---|---|---|
| Example 9 | 58.0 | 70.1 | 0.28 | 4200 #4 spindle @ 20 rpm | 18 dynes @ 974 rpm | 70.0 |
| Example 10 | 64.7 | 85.6 | 0.50 | 526 #2 spindle @ 20 rpm | 7.9 dynes @ 1100 rpm | 70.2 |

Examples 9–10 illustrate the nature of product viscosity improvement which can be achieved with the process of this invention. As shown in Table 5, the present invention (Example 10) produces a product with a better grade, an improved clay recovery and a significantly reduced viscosity.

EXAMPLES 11–12

Two samples of coarse-grained kaolin clay from Washington County, Ga. containing about 1.9% TiO$_2$ are floated using the conventional method and the present invention. These clay samples have a Brookfield viscosity >1000 cP.

For the conventional method (Example 11), 2000 dry grams of sample are blunged for 6 minutes at 6000 rpm using a high speed mixer. Blunging of the clay is conducted at 55% solids using 4.4 pounds per ton of sodium silicate and 2 pounds per ton soda ash. After dispersing the clay, 2 pounds per ton of CYTEC S-6493 MINING REAGENT (alkyl hydroxamate) is added, and the slurry is conditioned for 6 minutes at 6000 rpm in the same high speed mixer. The conditioned slurry is diluted to 25% solids using deionized water and then transferred to a DENVER D-12 flotation machine. A frother (AEROFROTH 65 from Cytec Industries) is added at a dosage of 0.2 pounds per ton, and the slurry is allowed to mix in the flotation machine for one minute. The slurry is then floated, and a portion is taken for x-ray fluorescence analysis to determine TiO$_2$ content. The remainder of the flotation product is ozoned to remove any residual flotation chemicals, classified by settling at about 75 minutes per inch of slurry and then flocculated by the addition of 2 pounds per ton of alum and adjusting the pH to 3 by adding sulfuric acid. The flocculated slurry is leached with 9 pounds per ton of sodium hydrosulfite, filtered, washed, refiltered and then dried. The clay sample is then deflocculated to 70% solids using 4.3 pounds per ton of sodium polyacrylate and 4 pounds per ton soda ash. The clay is then tested for Brookfield and Hercules viscosities.

The second sample (Example 12) is processed using the present invention. Two 1100 dry gram samples are mixed in a READCO laboratory mixer at 70% solids for 20 minutes in the presence of 2 pounds per ton of CYTEC S-6493 MINING REAGENT (alkyl hydroxamate). From these two samples, a 2000 dry gram clay sample is taken and blunged for 6 minutes at 6000 rpm in a high speed mixer. The sample is blunged at 50% solids using 2.2 pounds per ton of sodium silicate and 2 pounds per ton of soda ash. (Note that the present invention uses a smaller amount of dispersant than the conventional method.) The dispersed clay is then diluted to 25% solids using deionized water, transferred to a DENVER D-12 flotation machine and 0.2 pounds per ton of AEROFROTH 65 frother is added before flotation. The clay slurry is then floated, and a portion of the flotation product is taken for TiO$_2$ determination. The remainder is ozoned and then processed as described for Example 11. The clay product is then tested for Brookfield and Hercules viscosities.

As shown by the results given in Table 6, the amount of TiO$_2$ removed by flotation and the clay recovery using the present invention (Example 12) are equivalent to those using the conventional method (Example 11). Correspondingly, the coefficient of separation for the flotation process using the present invention is equivalent to that using the conventional method. However, this poor viscosity kaolin sample shows improved Brookfield and Hercules viscosities after processing using the present invention over that of the conventional method.

TABLE 6

| | % TiO$_2$ removed by flotation | % Yield of clay | Coefficient of separation | Brookfield viscosity (cP @ 20 rpm) | Hercules viscosity (dynes) |
|---|---|---|---|---|---|
| Example 11 | 50.8 | 86 | 0.39 | 3260 | 18 @ 990 rpm |
| Example 12 | 50.8 | 85 | 0.38 | 2240 | 18 @ 1100 rpm |

EXAMPLES 13–14

Tests are carried out using a relatively fine-grained East Georgia kaolin sample that has poor viscosity.

For the conventional method (Example 13), a 2000 dry gram sample is initially blunged for 6 minutes at 55% solids and 6000 rpm using a high speed mixer. In the blunging stage, 6.7 pounds per ton of sodium silicate and 3.5 pounds per ton of soda ash are added. After blunging, the dispersed clay is conditioned with 3 pounds per ton of CYTEC S-6493 MINING REAGENT (alkyl hydroxamate) for 6 minutes in the high speed mixer at 6000 rpm. The conditioned slurry is diluted to 25% solids, transferred to a DENVER D-12 flotation machine, 0.2 pounds per ton AEROFROTH 65 frother is added, and then mixed for 1 minute. The slurry is floated, and a portion of the flotation product is taken for TiO$_2$ determination. The flotation product is ozoned to remove residual flotation reagents, classified by settling at 20 minutes per inch of slurry, and flocculated with 12 pounds per ton of alum and sulfuric acid to adjust the pH to 3. The flocculated clay is leached with 9 pounds per ton of sodium hydrosulfite, filtered, washed with deionized water, refiltered and dried. The product is then optimally dispersed at 70% solids using sodium polyacrylate as the dispersant and soda ash to adjust the pH. The Brookfield and Hercules viscosities are then measured for this optimally dispersed slurry.

For the present invention (Example 14), two 1100 dry gram samples are conditioned with 3 pounds per ton of CYTEC S-6493 MINING REAGENT in a READCO laboratory mixer for 20 minutes. From these two batches of conditioned clay, a 2000 dry gram equivalent sample is taken and transferred to a high speed mixer. The conditioned clay is diluted to 50% solids and blunged for 6 minutes at 6000 rpm with 2.2 pounds per ton of sodium silicate and 3.5 pounds per ton of soda ash. The slurry is then diluted to 25% solids and floated in a DENVER D-12 flotation machine with 0.2 pounds per ton AEROFROTH 65 added as the frother. The flotation product is then ozoned and processed as described for Example 13. The flotation product TiO$_2$ grade is determined while the final product is analyzed for viscosity.

As shown in Table 7, this clay can be floated using either the conventional method or the present invention. However, the use of the present invention results in a product with improved low and high shear viscosities.

TABLE 7

| | % TiO$_2$ removed by flotation | % Yield of clay | Coefficient of separation | Brookfield viscosity (cP @ 20 rpm) | Hercules viscosity (dynes @ 1100 rpm) |
|---|---|---|---|---|---|
| Example 13 | 84.3 | 89 | 0.75 | 618 | 3.86 |
| Example 14 | 82.4 | 86 | 0.68 | 440 | 1.45 |

This invention has been described in detail with particular reference to certain embodiments, but variations and modifications can be made without departing from the spirit and scope of the invention as defined in the following claims.

What is claimed is:

1. A kaolin clay slurry formed by a process which comprises the sequential steps of:
   A. obtaining a homogeneous mixture by mixing, in the absence of a dispersant, kaolin clay and a collector to condition the impurities, wherein water is present in an amount sufficient to yield a mixture having a solids content of at least 65% by weight; and
   B. deflocculating the kaolin clay mixture at a pH of at least 4.0 with a dispersant in an amount sufficient to yield a kaolin clay slurry which is suitable for subsequent processing to remove colored titaniferous impurities.

2. A kaolin clay slurry as defined by claim 1 wherein the collector is a fatty acid compound having the general formula:

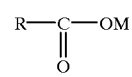

in which R is an alkyl, aryl or alkylaryl group having 1–26 carbon atoms, and M is hydrogen, an alkali metal or an alkaline earth metal.

3. A kaolin clay slurry as defined by claim 2 wherein R is methyl, ethyl, butyl, octyl, lauryl, 2-ethylhexyl, oleyl, eicosyl, phenyl, tolyl, naphthyl or hexylphenyl.

4. A kaolin clay slurry as defined by claim 2 wherein M is hydrogen, lithium, sodium, potassium, magnesium, calcium or barium.

5. A kaolin clay slurry as defined by claim 2 wherein the fatty acid compound is a tall oil.

6. A kaolin clay slurry as defined by claim 1 wherein the collector is a hydroxamate compound having the general formula:

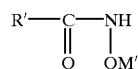

in which R' is an alkyl, aryl or alkylaryl group having 4–28 carbon atoms, and M' is hydrogen, an alkali metal or an alkaline earth metal.

7. A kaolin clay slurry as defined by claim 6 wherein R' is butyl, octyl, lauryl, 2-ethylhexyl, oleyl, eicosyl, phenyl, tolyl, naphthyl or hexylphenyl.

8. A kaolin clay slurry as defined by claim 6 wherein M' is hydrogen, lithium, sodium, potassium, magnesium, calcium or barium.

9. A kaolin clay slurry as defined by claim 6 wherein the hydroxamate compound is an alkyl hydroxamate.

10. A kaolin clay slurry as defined by claim 1 wherein the dispersant is sodium silicate.

11. A kaolin clay slurry as defined by claim 1 wherein the dispersant is a polyacrylate.

12. A kaolin clay slurry as defined by claim 1 wherein the dispersant is sodium hexametaphosphate.

13. A kaolin clay slurry as defined by claim 1 wherein a pH modifier is added in step (B).

14. A kaolin clay slurry as defined by claim 13 wherein the pH modifier is soda ash, sodium hydroxide, ammonium hydroxide, potassium hydroxide, lithium hydroxides or mixtures thereof.

15. A kaolin clay slurry as defined by claim 1 wherein a frothing agent is added in step (B).

* * * * *